(12) United States Patent
Gong

(10) Patent No.: US 6,577,997 B1
(45) Date of Patent: Jun. 10, 2003

(54) SYSTEM AND METHOD OF NOISE-DEPENDENT CLASSIFICATION

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/560,500

(22) Filed: Apr. 27, 2000

Related U.S. Application Data

(60) Provisional application No. 60/136,778, filed on May 28, 1999.

(51) Int. Cl.⁷ .............................................. G10L 15/08
(52) U.S. Cl. .................... 704/252; 704/233; 704/250
(58) Field of Search ................. 704/226, 231, 704/233, 234, 238–240, 247, 250, 252, 254–256

(56) References Cited

U.S. PATENT DOCUMENTS

| | | |
|---|---|---|
| 5,218,668 A | 6/1993 | Higgins et al. ............. 704/200 |
| 5,416,887 A | 5/1995 | Shimada ..................... 704/233 |
| 6,006,182 A | 12/1999 | Fakhr et al. ................. 704/231 |
| 6,044,343 A | 3/2000 | Cong et al. .................. 704/236 |
| 6,188,982 B1 * | 2/2001 | Chiang ........................ 704/256 |
| 6,195,634 B1 | 2/2001 | Dudemaine et al. ........ 704/231 |
| 6,275,800 B1 | 8/2001 | Chevalier et al. ........... 704/246 |

OTHER PUBLICATIONS

Yunxin Zhao "Channel identification and signal spectrum estimation for robust A.S.R." Dec. 1998 IEEE, pp 305–308.*

* cited by examiner

Primary Examiner—Daniel Abebe
(74) Attorney, Agent, or Firm—Robert L. Troike; Frederick J. Telecky, Jr.

(57) ABSTRACT

A noise-dependent classifier for a speech recognition system includes a recognizer (15) that provides scores and score differences of two closest in-vocabulary words from a received utterance. A noise detector (17) detects the noise level of a pre-speech portion of the utterance. A classifier (19) is responsive to the detected noise level and scores and noise dependent model for making decisions for accepting or rejecting the utterance as a recognized word depending on the noise-dependent model and the scores.

16 Claims, 3 Drawing Sheets

SYSTEM AND METHOD OF NOISE-DEPENDENT CLASSIFICATION

This application claims priority under 35 USC §119(e)(1) of provisional application No. 60/136,778, filed May 28, 1999.

FIELD OF INVENTION

This invention relates to recognition and more particularly to noise-dependent rejection decision.

BACKGROUND OF INVENTION

Speech recognition is finding more uses today in noisy environments. Speech recognition involves matching acoustic models to input speech and generating probability scores for the match to the models. Simple score-difference-based decision has been reported by C. S. Ramalingam, Y. Gong, L. P. Netsch and Anderson in *Proc. of IEEE Int. Conf. on Acoustics, Speech, and Signal Processing,* entitled "Speaker-dependent Name Dialing in a Car Environment," Phoenix, March 1999. Speech recognition in these noisy environments such as use along a highway can cause severe problems in speech recognition.

SUMMARY OF INVENTION

In accordance with one embodiment of the present invention, improvement is provided by noise-dependent classification of the input that includes detecting noise level and providing a score value based on input recognition. A classifier is responsive to the detected input noise level and the score value for making acceptance or rejection decisions.

In accordance with another embodiment of the present invention, a speech recognition system includes a speech recognizer which has a database of in-vocabulary words that provides a difference score for an utterance relating to in-vocabulary words and a noise detector that detects noise level of the utterance and a classifier responsive to the detected noise level and the difference score for accepting or rejecting the closest in-vocabulary word as a recognized word.

DESCRIPTION OF THE PREFERRED EMBODIMENTS OF THE PRESENT INVENTION

Figure 1:
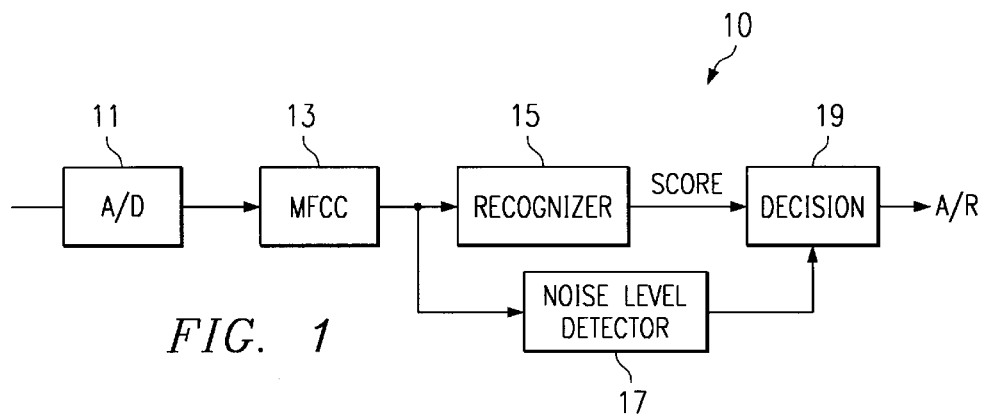
FIG. 1 is a block diagram of the recognition system according to one embodiment of the present invention.

Referring to FIG. 1, there is illustrated a speech recognizer 10 according to one embodiment of the present invention.

The incoming analog speech is converted to digital data speech frames at A/D converter 11 which samples the incoming speech and converts samples to digital data. The speech frames are applied to Mel Frequency Cepstral Coefficient (MFCC) processor 13. The speech frame or token is applied to recognizer 15 and pre-speech portion is applied to noise detector 17, which measures the noise level by averaging the energy over eight frames. The output from the recognizer 15 and the noise level detected from detector 17 are applied to classifier 19 to determine acceptance or rejection of the speech frame. The recognizer 15 output provides scores based on probability the received utterance is a recognized word. The score should be high for in-vocabulary words (IV) and low for out of vocabulary words (OOV). The recognizer 15 includes an in-vocabulary database. The classifier 19 should output "Acceptance" if an IV word is spoken and "Rejection" if an OOV word is spoken. For example, if the vocabulary is only "yes" and "no" and a spoken "yes" is received, the distance of the detected spoken word should be close to "yes" and far from "no" so the score difference is high. That is the probability it is a "yes" is high. The classifier 19 then accepts "yes" and decides A (for acceptance). If, on the other hand, the input is "hello", this is an out of vocabulary word and the score is low and the classifier should emit a "Rejection" decision. The words are sorted according to the scores. First, we calculate the distance of X (the pronounced word) with respect to all vocabulary words. If we have ten vocabulary words, we have ten values. Then, the vocabulary words are sorted according to their score. For example, 6.1, 5.1, 4.8, . . . 1.5, where 6.1 is the highest score where the pronounced word X is closest to the vocabulary word. The next step is to calculate the difference between the top (highest) score and the second highest score. For the example, it is 6.1−5.1=1. The score difference is used by the classifier to make a decision.

Figure 2:
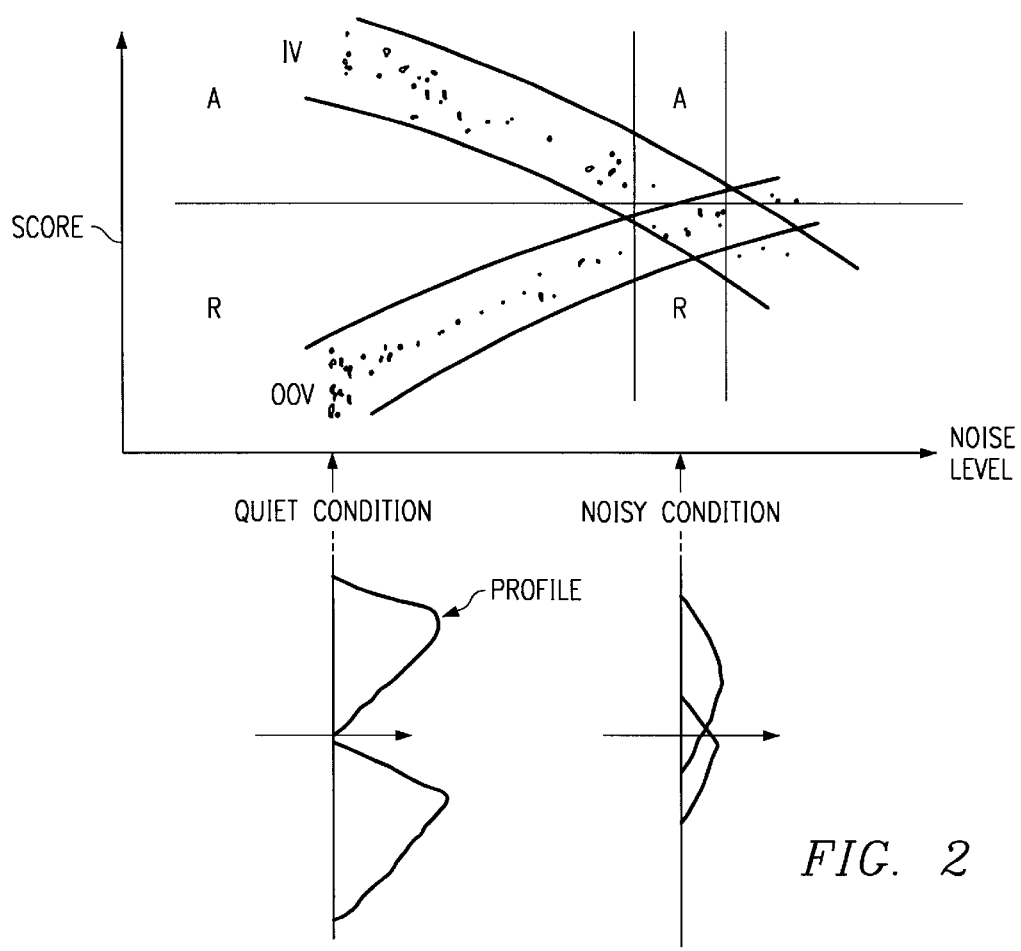
FIG. 2 illustrates noise level versus difference score and profile of scored sample under quiet and noisy conditions.

The next consideration is the noise level. The score difference distribution changes as conditions get noisier. Referring to FIG. 2, in-vocabulary such as "yes" is represented by A and out of vocabulary such as "hello" is represented by R. The difference score distribution of the vocabulary words is the highest in the quiet condition. The in-vocabulary and out of vocabulary words are far apart in the quiet condition. The profile shape is represented by a bell-shaped distribution for A and R in the quiet condition. As the noise level increases, the difference score distribution decreases as represented by an area A between two parallel lines. As the noise level increases, the out of vocabulary sounds produce higher difference scores as represented by the area R between two parallel lines. Under noisy conditions, the difference score is much less and the profile no longer reflects the distinct difference. This is particularly true of highway car mode with its attendant high noise. Under noisy conditions, the profile shape is changed to have a decrease mean and variance of the distribution of recognition scores changes.

Figure 3:
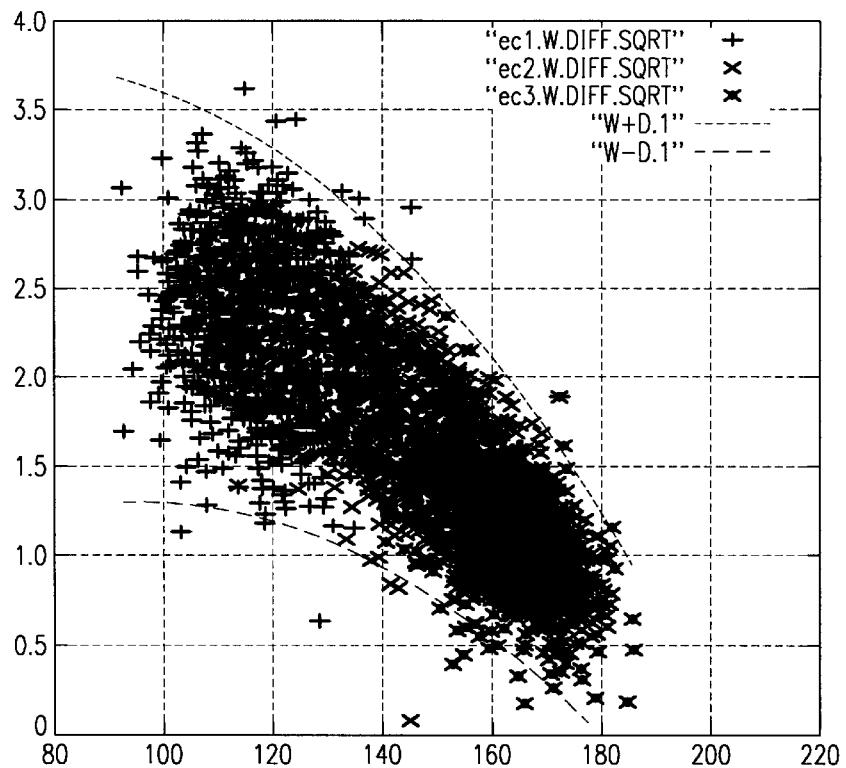
FIG. 3 is a plot of noise level versus score difference.

Referring to FIG. 3, the distribution of the score $O_x$ is be affected by noise $O_n$. The x-axis is noise and the y-axis is the score difference between the two highest scores on $O_x$. FIG. 3 shows that the score difference distribution changes as the test condition becomes noisier. The changes include decreased mean and shrinking variance.

To make reliable acceptance/rejection decision, it is necessary to model the change of distribution. In this application, the model is made a noise-dependent multivariant Gaussian distribution, where both mean and variance of the distribution of recognition scores are allowed to change as function of noise power.

In FIG. 3, the "+" symbol represents the score difference distribution for quiet conditions; the "X" represents the recognition score difference distribution for a car driven in stop and go traffic and "*" represents the recognition score difference distribution for a car on a noisy highway. Note that for quiet conditions, the scores appear to have large difference values centered at about 2.4 and for highway noise conditions low difference values centered at about 1.

At any given noise level, we want the best decision to determine if a given received input X is in-vocabulary or out of vocabulary. The classifier 19 for a given noise level and score difference decides to accept the highest score word match or to reject. To do this, we need to model the change of difference score distribution. According to the present invention, the model is noise-dependent multi-variate Gaussian distribution where both the mean and variance of the distribution of recognized scores change as a function of noise power.

Decision Model

We assume that, for each utterance token, the recognizer produces a score feature vector $O_x \in R^D$, and a measure of noise energy $O_n$ at which the test utterance is recorded from noise detector 17. The pair score feature vector and noise $(O_x, O_n)$ is the observation of the decision system under study.

Let $$p \triangleq \{W, B\} \qquad (1)$$

be the set of with-in (w) and between classes (B) or in-vocabulary and out of vocabulary, respectively. We assume that each class $s \in P$ is associated with a multi-variant Gaussian mixture distribution:

$$p(O_x \mid s, O_n) = \sum_k \alpha_k^S N\left(O_x; \mu_{n,k}^S, \sum_{n,k}^S\right) \qquad (2)$$

where $$\alpha_k^s \triangleq Pr(k \mid s)$$

is the priori probability of component k associated to the class s. The symbol N stands for Gaussian distribution, $O_x$ is the score feature (e.g., score difference), $\mu_{n,k}$ is the mean level for s at detected noise level, $\Sigma_{n,k}^s$ is the variance width for noise level n and k is the index of Gaussian distribution $$\sum_k \alpha_k^s = 1 \qquad (3)$$

i.e., $\alpha_k^s$ up to 1.

At the decision time, given $(O_x, O_n)$, the decision is given by:

$$\hat{s} = \underset{s \in p}{\operatorname{argmax}} \beta_s Pr(s \mid O_x) \qquad (4)$$

$$= \underset{s \in p}{\operatorname{argmax}} \{\log \beta_s + \log Pr(s) + \log p(O_x \mid s, O_n)\} \qquad (5)$$

where $\beta_s$ specifies the importance of making a wrong decision for $$s, \sum_{s \in p} \beta_s = 1, Pr(s)$$

is a priori probability of class s.

Figure 4:
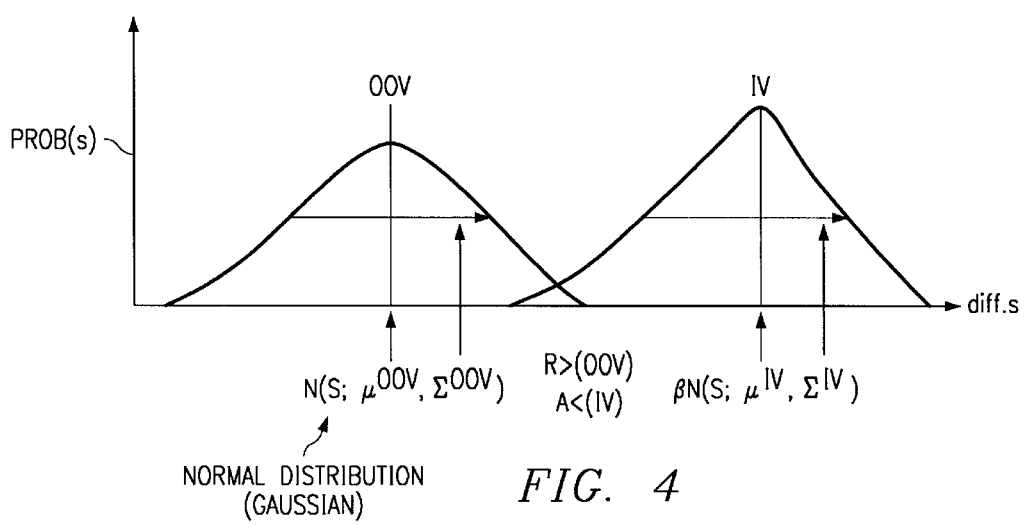
FIG. 4 is a plot of probability versus difference score illustrating mean level and variance width.

Referring to FIG. 4, the mean or maximum probability is represented by $\mu^O$ for out of vocabulary and the variance width is represented by $\Sigma^O$. To the right is the second bell curve for in-vocabulary where $\mu^{IV}$ is the means for in-vocabulary and $\Sigma^{IV}$ is the variance width for in-vocabulary. If the curve at the left is greater than the curve at the right, it means that the received input x is out of vocabulary and should be rejected, and if the curve at the right is greater than the curve at the left, the input x is probably in-vocabulary and should be accepted. The β is the weighing in equations (4) and (5).

The set of parameters $$\lambda \triangleq \left\{\alpha_K^S, \mu_{n,k}^S, \sum_{n,k}^s\right\}$$

controls the decision result. In the next two sections, we specify the decision parameters and describe how to estimate them based on a set of training data.

Parameter Estimation

In order to determine the mean and variance which are dependent on noise, we need to determine the criteria for choosing the parameters.

Let $$O \triangleq \{O_x, O_n\} \qquad (6)$$

Denote the set of training data labeled O to the class s (B or W) by:

$$O^s \triangleq \{O_1^s, O_2^s, \dots O_{M_s}^s\} \qquad (7)$$

where $M_s$ the number of training observations (a token or difference score). Denote further the set of training observations of all classes by:

$$O \triangleq \{O_1^s, \forall s \in P\} = \{O^B, O^W\} \qquad (8)$$

We need to derive an optimum set $\hat{\lambda}$ of parameters which maximizes the log-likelihood:

$$\hat{\lambda} = \underset{\lambda}{\operatorname{argmax}} \log p(O \mid \lambda) \qquad (9)$$

Denote an existing parameter set by λ'. According to the EM-procedure, maximizing equation (9) is equivalent to iteratively maximizing the following quantity:

$$Q(\lambda \mid \lambda') = \sum_{s \in P} \sum_{(O_X, O_n) \in o^S} \sum_k \log p(O_x, k \mid O_n, \lambda) Pr(k \mid O_x, O_n, \lambda') \qquad (10)$$

where $$p(O_x, k \mid O_n, \lambda) = p(O \mid k, O_n, \lambda) Pr(k \mid O_n, \lambda) \qquad (11)$$

Using Bayes rule, $\Pr(k|O_x,O_n,\lambda')$ can be written in terms of probability density function of $O_x$ given the mixing component k and model $\lambda'$:

$$\Pr(k \mid O_x, O_n, \lambda') = \frac{p(O_x, k \mid O_n, \lambda')}{p(O_x \mid O_n, \lambda')} \quad (12)$$

$$= \frac{p(O_x \mid k, O_n, \lambda')\Pr(k \mid O_n, \lambda')}{\sum_k p(O_x \mid k, O_n, \lambda')\Pr(k \mid O_n, \lambda')}$$

and $$p(O_x \mid k, O_n, \lambda) = N\left(O_x; \mu_{n,k}^s, \sum_{n,k}^s\right) \quad (13)$$

From equation (10), equation (11) and equation (13) the objective function $Q(\lambda|\lambda')$ is maximized with respect to unknown parameters, $$Q(\lambda \mid \lambda') = \sum_{s \in P} \sum_{(O_x,O_n) \in O^s} \sum_k \{\Pr(k \mid O_x, O_n, \lambda')\log p(O_x \mid k, O_n, \lambda) + \quad (14)$$

$$\Pr(k \mid O_x, O_n \lambda')\log \Pr(k \mid O_n, \lambda)\}$$

$$= \sum_{s \in P} \sum_{(O_x,O_n) \in O^s} \sum_k \left\{\Pr(k \mid O_x, O_n, \lambda')N\left(O_x; \mu_{n,k}^s, \sum_{n,k}^s\right) + \right.$$

$$\left. \Pr(k \mid O_x, O_n, \lambda')\log \alpha_k^s \right\}$$

Mixture Coefficient $\alpha_k^s$

To obtain the estimation of the a priori probability of the mixing coefficient $\alpha_k^s$, we apply Lagrange method to equation (14) with the constraint of equation (3):

$$\frac{\partial}{\partial \alpha_k^s}\left\{Q(\lambda \mid \lambda') + \theta \sum_k \alpha_k^s\right\} = \quad (15)$$

$$\frac{\partial}{\partial \alpha_k^s}\left\{\sum_{s \in P}\sum_{(O_x,O_n) \in O^s}\sum_k P(k \mid O_x, O_n, \lambda')\log \alpha_k^s - \theta \sum_k \alpha_k^s\right\} = 0$$

which gives $$\sum_{(O_x,O_n) \in O^s} \Pr(k \mid O_x, O_n, \lambda') - \theta \alpha_k^s = 0 \quad (16)$$

summing over k gives $$\theta = \sum_{(O_x,O_n) \in O^s} \sum_k^P k \mid O_x, O_n, \lambda') = M_s \quad (17)$$

Therefore, $$\alpha_k^s = \frac{1}{M_s} \sum_{(O_x,O_n) \in O^s} \Pr(k \mid O_x, O_n, \lambda') \quad (18)$$

Noise-dependent Mean Vector $$\mu_{n,k}^s$$

We further assume that the mean vector is a polynomial function of noise n:

$$\mu_{n,k}^s \triangleq \sum_j c_{j,k}^s n^j \quad (19)$$

With equation 19, equating the partial derivative of equation 14 with respect to $c_{j,k}^s$ to zero, we have:

$$\frac{\partial}{\partial c_{j,k}^s} Q(\lambda \mid \lambda') = \frac{\partial}{\partial c_{j,k}^s}\sum_{s \in P}\sum_{(O_x,O_n) \in O^s}\sum_k \Pr(k \mid O_x, O_n, \lambda')\log N\left(O_x; c_{j,k}^s, \sum_{i,k}^s\right) \quad (20)$$

$$= \sum_{(O_x,O_n) \in O^s} \Pr(k \mid O_x, O_n, \lambda')(\sum_{n,k}^s)^{-1}\left(O_x - \sum_{p=0}^{P_k^s} c_{k,p}^s O_n^p\right) \cdot O_n^j \quad (21)$$

$$= 0 \quad (22)$$

By regrouping terms, equation 20 becomes:

$$\sum_{p=0}^{P_k^s} \sum_{(O_x,O_n) \in O^s} P(k \mid O_x, O_n, \lambda')(\sum_{n,k}^s)^{-1} O_n^{p+k}, c_{k,p}^s = \quad (23)$$

$$\sum_{(O_x,O_n) \in O^s} P(k \mid O_x, O_n, \lambda')(\sum_{n,k}^s)^{-1} O_n^j, O_x$$

Let $$\eta_k^s(O_x, O_n, m) \triangleq \Pr(k \mid O_x, O_n, \lambda'(\sum_{n,k}^s)^{-1} O_n^m \quad (24)$$

Equation 23 can be written as $$\sum_{p=0}^{P_k^s} \sum_{(O_x,O_n)\in O^s} \eta_k^s(O_x, O_n, p+j) \cdot c_{k,p}^s = \sum_{(O_x,O_n)\in O^s} \eta_k^s(O_x, O_n, J) \cdot O_x \quad (25)$$

Equation 25 describes, for each mixture component k, a linear equation system $P_k^s+1$ with variables defined in the vector space $R^D$, which can be written in a compact form:

$$A_k^s c_k^s = b_k^s \quad (26)$$

$A_k^s$ is a $(P_k^s+1)\times(P_k^s+1)$ dimensional matrix:

$$A_k^s \triangleq \begin{bmatrix} a_{k,(0,0)}^s & \cdots & a_{k,(0,P_k^s)}^s \\ \vdots & a_{k,(p,j)}^3 & \vdots \\ a_{k,(P_k^s,0)}^s & \cdots & a_{k,(P_k^s,P_k^s)}^s \end{bmatrix} \quad (27)$$

where $$a_{k,(p,j)}^s \triangleq \sum_{(O_x,O_n)\in O^s} \eta_k^s(O_x, p+j) \quad (28)$$

$b_k^s$ is a $(P_k^s+1)$ dimensional vector:

$$b_{k_n}^s \triangleq [b_{k,0}^s, \ldots b_{k,j}^s, \ldots b_{k,P_k^s}^s]^T \quad (29)$$

where $$b_{k,j}^s \triangleq \sum_{(O_x,O_n)\in O^s} \eta_k^s(O_x, O_n, j) \cdot O_x \quad (30)$$

and $c_k^s$ a $(P_k^s+1)$ dimensional vector:

$$c_k^s \triangleq [c_{k,0}^s, \ldots c_{k,j}^s, \ldots c_{k,P_k^s}^s]^T \quad (31)$$

Finally, $c_k^s$ can be obtained by any adequate linear system solution method. In solving equation 26, the value of $$(\sum_{n,k}^s)^{-1}$$

can be substituted by the one in the $\lambda'$ set.

Noise-dependent covariance matrix $$\sum_{n,k}^s$$

We assume diagonal covariance matrix and therefore each dimension of the feature vector can be processed independently.

For each dimension, the value range of $O_x$ is partitioned into Q equal intervals. Let the value at the lower end of the q-th interval be $n_q$. The variance over the q-th interval is given by:

$$\sigma_{k,q}^s \triangleq \frac{\sum_{(O_x,O_n)\in O^s, n_q \leq O_n < n_{q+1}} (O_x - \mu_{n,k}^s)^2}{\sum_{(O_x,O_n)\in O^s, n_q \leq O_n < n_{q+1}}} \quad (32)$$

Denote the count of mixture k at interval q as:

$$\theta_{k,q}^s \triangleq \sum_{(O_x,O_n)\in Q^s, n_q \leq O_n < n_{q+1}} \Pr(k|O_x, O_n, \lambda') \quad (33)$$

We assume that the distribution of $\sigma_{k,p}^s$ is a noise-dependent Gaussian and that the mean of $\sigma_{k,p}^s$ as a polynomial function of n, the same way as for the mean vectors developed in the noise-dependent mean vector section:

$$\sigma_{n,k}^s \triangleq \sum_j \hat{d}_{k,p}^s n^j \quad (34)$$

As we are only interested in the mean of $\sigma_{k,q}^s$, we assume its variance to be independent of n. To estimate polynomial parameters of $\sigma_{k,q}^s$, the result of the noise-dependent mean vector section can be reused. In particular, equation 23 is revised as:

$$\sum_{p=0}^{P_k^s} \sum_{q=1}^{Q} \theta_{k,}^s (n_q)^{p+j} \hat{d}_{k,p}^s = \sum_{q=1}^{Q} \theta_{k,q}^s (n_q)^j \cdot \sigma_{k,q}^s \quad (35)$$

which is a linear system of $\hat{d}_{k,p}^s$ and can be solved using the same procedure as described in the noise-dependent mean vector section. The variance $$\sum_{n,k}^s$$

is then given by the following polynomial expression:

$$\sum_{n,k}^s \triangleq \sum_j \hat{d}_{k,p}^s n^j \quad (36)$$

Evaluation Results

Database

The evaluation database consists of the name-dialing task recorded with hands-free distant microphone, in four recording conditions:

parked-trn: car parked, engine of, parked-eval (ec1): car parked, engine off, stopngo-eval (ec2): car driven on a stop and go basis, hiway-eval (ec3): car operating on highway.

In each session, 20 speakers (10 male) each read 50 names in 2 repeats. The total number of utterances per condition is slightly smaller than 2000. The database is sampled at 8 kHz, with MFCC analysis frame rate of 20 ms.

Decision Parameters

In this task, we need to make a decision whether the recognition result of a given test utterance should be accepted. In other words, referring to equation 1, we need to decide if the recognition result comes from in-vocabulary test (IV, or with-in class) or from out-of-vocabulary test (OOV, or out of class). In IV tests, the vocabulary size is 50. In OOV tests, to test each of the 50 names, the other 49-names are used as vocabulary.

A decision is made based on the values of $(O_x, O_n)$:

$O_x$ is a decision feature vector of two components: the log-likelihood of the first candidate of the recognition, and the difference in log-likelihood between the top two candidates.

$O_n$ is the noise level of the test utterance: measures as the average $c_0$ (0-th coefficient of the MFCC) over 8 pre-speech frames.

We chose to use 2-nd order polynomial for mean decision feature vectors, and 1-st order for variance. The number of mixture component is set to one per class.

Experimental Results

For IV tests, a acceptance decision should be issued and, for OOV tests, a rejection decision should be issued. The decision could incur two types of errors, i.e. false rejection of an IV item and false acceptance of an OOV item.

Figure 5:
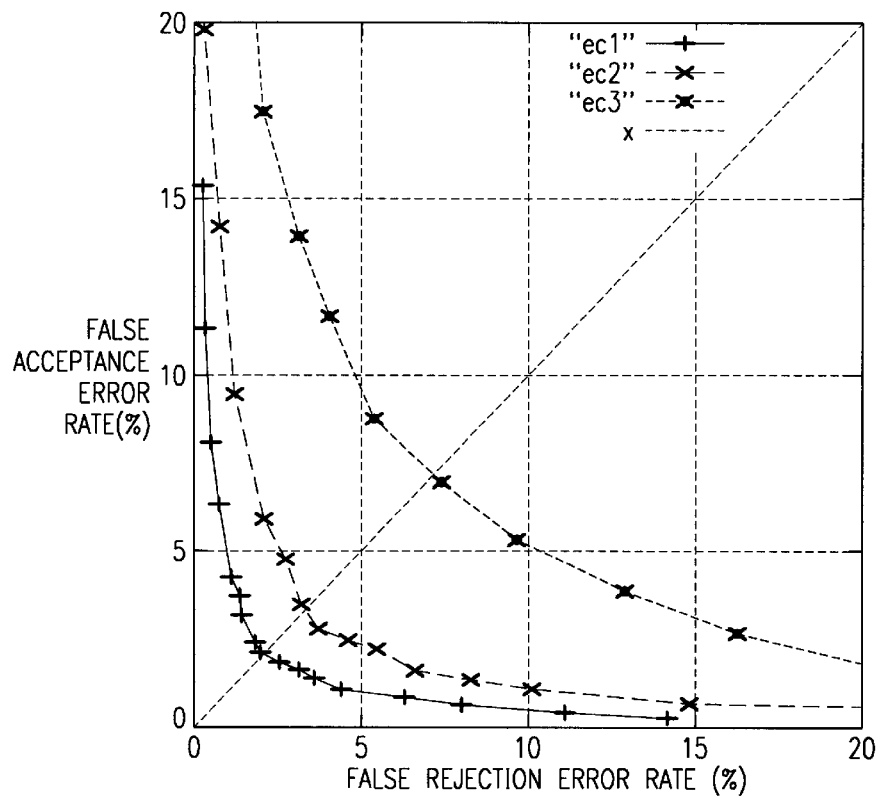
FIG. 5 illustrates name dialing decision using noise dependent polynomial.

As indicated in equation 5, it is possible to balance to two types of errors by adjusting the values of $\beta_s$. FIG. 5 plots the observed relationships between the two types of errors, for the three test conditions. For reference, equal error rate line is also plotted.

Figure 6:
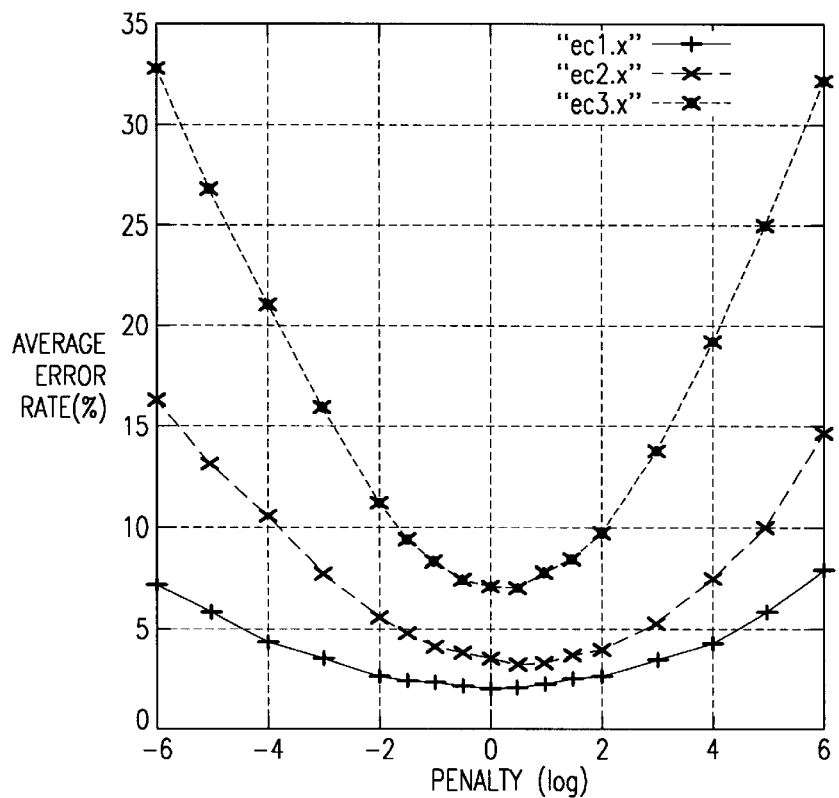
FIG. 6 illustrates average error rate as a function of noisy conditions and penalty settings.

To measure the total error rate performance, we define average error rate as the average of the false rejection error rate and the false acceptance error rate. In FIG. 6, the average error as function of penalty $\beta_w (\beta_B=0)$ is plotted.

In Table 3.3.3 we should, for each of the three test conditions, the total number of tested tokens, the name recognition error rate (without rejection decision), and the minimum equal error rate.

| Test condition | Test size | Word error rate (%) | MEER (%) |
|---|---|---|---|
| hiway-eval (ec3) | 1984 | 0.25 | 7.06 |
| stopngo-eval (ec2) | 1986 | 0.10 | 3.25 |
| parked-eval (ec1) | 1985 | 0.00 | 2.04 |

APPLICATION TO OTHER FIELDS

The present invention can be applied to any classification situations where background noise level may affect the parameters of the decision.

What is claimed is:

1. A noise-dependent classifier for rejection decisions based on scores and noise comprising:
   a noise detector for detecting the noise level;
   a score generator for providing score values based on input recognition; and a classifier responsive to the detected noise level and scores for making an acceptance or rejection decision by calculating the score as a mixture of Gaussian distributions with mean vector and variance matrix adjusted to compensate the detected noise level.

2. A noise-dependent classifier for rejection decisions based on scores and noise comprising: a noise detector for detecting the noise level; a score generator for providing score values based on input recognition; and a classifier responsive to the detected noise level and scores for making an acceptance or rejection decision; said classifier includes a noise dependent model which treats scores as a multi-dimensional Gaussian distribution with noise-dependent mean vector and covariance matrix and noise dependency is modeled as a polynomial function of noise.

3. The system of claim 2, wherein the Gaussian mixture distribution is $$P(O_x \mid s, O_n) = \sum_{\mu} \alpha_k^s N\left(O_x, \mu_{n,k}^s, \sum_{n,k}^s\right)$$

where $$\alpha_k^s \triangleq \Pr(k \mid s)$$

is the a priori probability of component k associated to the class s, $Q_x$ is the score, $\mu_{n,k}^s$ is the noise dependent mean vector, $O_n$ is the measure/noise energy, N is Gaussian and $$\sum_{n,k}^s$$

is the noise-dependent covariance matrix.

4. A speech recognition system comprising:
   a speech recognizer that provides scores and score-difference of closest two in-vocabulary words and out of vocabulary words in a received utterance;
   a noise detector for detecting the noise level of the pre-speech portion of the utterance; and
   a classifier responsive to the noise level and the scores for accepting or rejecting the utterance as a recognized word by calculating the score as a mixture of Gaussian distributions with mean vector and variance matrix adjusted to compensate the detected noise level.

5. The system of claim 4, wherein said classifier includes a noise-dependent model for making acceptance/rejection decisions.

6. The system of claim 4, wherein said recognizer generates a first difference score based on the difference between the two closest in-vocabulary words to the detected utterance and a second difference score between the two closest out of vocabulary words.

7. A speech recognition system comprising: a speech recognizer that provides scores and score-difference of closest two in-vocabulary words and out of vocabulary words in a received utterance; a noise detector for detecting the noise level of the pre-speech portion of the utterance; and a classifier responsive to the noise level and the scores for accepting or rejecting the utterance as a recognized word; said classifier includes a noise-dependent model for making acceptance/rejection decisions; said recognizer generates a first difference score based on the difference between the two closest in-vocabulary words to the detected utterance and a second difference score between the two closest out of vocabulary words and the model treats scores as a multi-dimensional Gaussian distribution with noise-dependent mean vector and covariance matrix, and noise dependency is modeled as a polynomial function of noise.

8. The system of claim 7, wherein the Gaussian mixture distribution is $$P(O_x \mid s, O_n) = \sum_{k} \alpha_k^s N\left(O_x, \mu_{n,k}^s, \sum_{n,k}^s\right)$$

where $$\alpha_k^s \triangleq \Pr(k \mid s)$$

is the a priori probability of component k associated to the class s (in-vocabulary or out of vocabulary), $O_x$ is the score, $\mu_{n,k}^s$ is the noise mean vector, $O_n$ is the measure of noise energy, N is Gaussian, and $$\sum_{n,k}^s$$

is the noise-dependent covariance matrix.

9. The classifier of claim 7 wherein the polynomial coefficients c of the decision classifier c are determined by solving the linear equation Ac=b where elements of A are composed of a weighted sum of powers of noise level and the elements of b are composed of weighted sum of measured recognizer scores.

10. The classifier of claim 9 wherein said weights are composed of the counts of a given Gaussian component.

11. A method for finding decision parameters for either accepting or rejecting recognized items based on scores associated with the item comprising the steps of:

estimating the a priori probability $\alpha_k^s$ where $$\alpha_k^s \triangleq \Pr(k \mid s)$$

is the a priori probability of component k associated to the class s;

determining noise-dependent mean vector $\mu_{s,k}^s$ as a polynomial function of noise;

determining noise-dependent covariance matrix $$\sum_{n,k}^s$$

as a polynomial function of noise;

modeling the change of distribution by noise dependent multi-variate Gaussian distribution where both mean and variance of the distribution of scores change as a function of noise power according to $$P(O_x \mid s, O_n) = \sum_\mu \alpha_k^s N\left(O_x, \mu_{n,k}^s, \sum_{n,k}^s\right)$$

where $O_x$ is the socre and $O_n$ is the noise measure.

12. A speech recognition system comprising:
a converter for converting analog speech to digital data speech frames;
a Mel Frequency Cepstral Coefficient (MFCC) processor means coupled to said converter;
a speech recognizer coupled to the MFCC processor means that provides scores and score-difference of closest two in-vocabulary words from a received utterance;
a noise detector coupled to the MFCC processor means for detecting the noise level of a pre-speech portion of the utterance; and
a classifier responsive to the detected noise level and the scores for accepting or rejecting the utterance as a recognized word.

13. The system of claim 12, wherein said classifier includes a noise-dependent model for making decisions.

14. The system of claim 13, wherein said classifier includes a noise-dependency model for making acceptance decisions which model probability of both in-vocabulary and out of vocabulary as a function of noise levels.

15. A speech recognition system comprising: a converter for converting analog speech to digital data speech frames; a Mel Frequency Cepstral Coefficient (MFCC) processor means coupled to said converter; a speech recognizer coupled to the MFCC processor means that provides scores and score-difference of closest two in-vocabulary words from a received utterance; a noise detector coupled to the MFCC processor means for detecting the noise level of a pre-speech portion of the utterance; and a classifier responsive to the detected noise level and the scores for accepting or rejecting the utterance as a recognized word; said classifier includes a noise-dependent model for making decisions; said classifier includes a noise-dependency model for making acceptance decisions which model probability of both in-vocabulary and out of vocabulary as a function of noise levels; said model treats scores as a multi-dimensional Gaussian distribution with noise-dependent mean vector and covariance matrix, and noise dependency is modeled as a polynomial function of noise.

16. The system of claim 15, wherein the Gaussian mixture distribution is $$P(O_x \mid s, O_n) = \sum_k \alpha_k^s N\left(O_x, \mu_{n,k}^s, \sum_{n,k}^s\right)$$

where $$\alpha_k^s \triangleq Pr(k \mid s)$$

is the prior probability of component k associated to the class s (in-vocabulary or out of vocabulary), $O_x$ is the score, $\mu_{n,k}^s$ is the noise-dependent mean vector, $O_n$ is the measure of noise energy, N is Gaussian, and $$\sum_{n,k}^s$$

is the noise dependent covariance matrix.

* * * * *